E. HOUGH.
Ox-Yoke.
No. 9,172.
Patented Aug. 3, 1852.
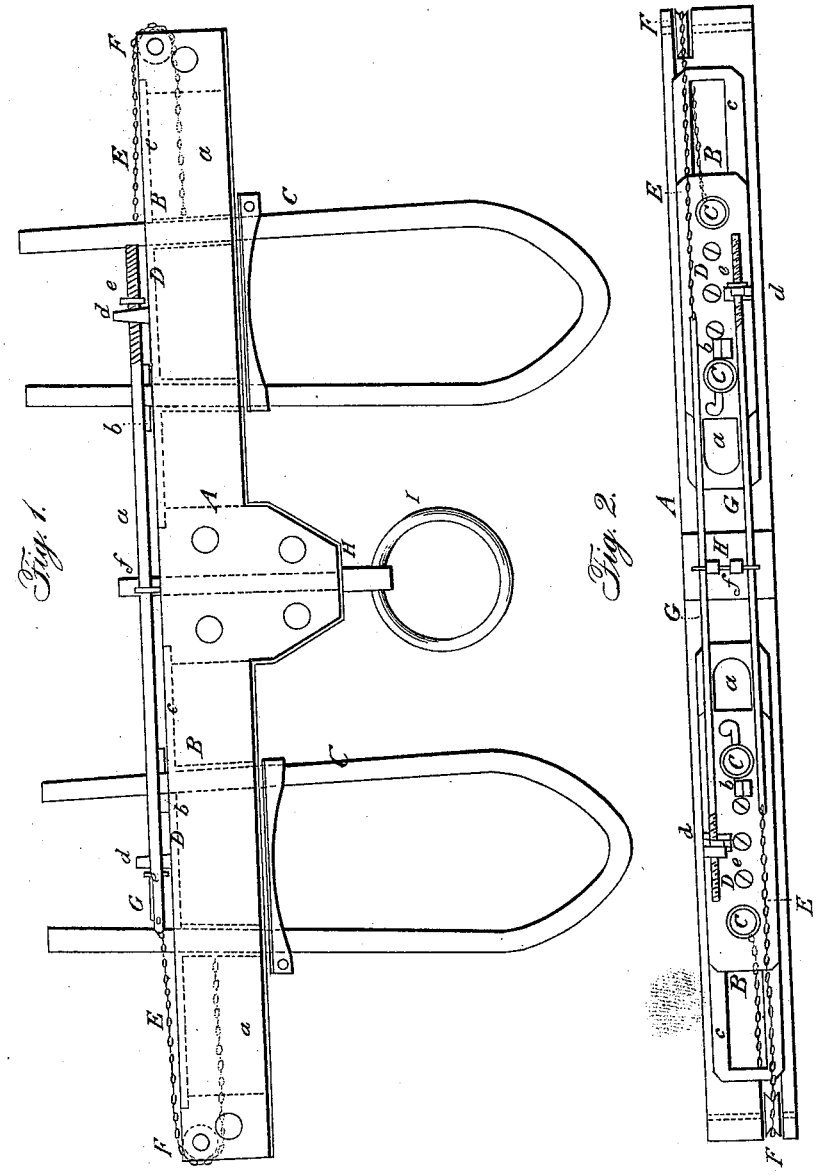

UNITED STATES PATENT OFFICE.

EZRA HOUGH, OF ST. JOHNSVILLE, NEW YORK.

OX-YOKE.

Specification of Letters Patent No. 9,172, dated August 3, 1852.

*To all whom it may concern:*

Be it known that I, EZRA HOUGH, of St. Johnsville, in the county of Montgomery and State of New York, have invented a new and useful Improvement in Slide-Yokes for Oxen; and I do hereby declare that the following is a full, clear, and exact description of the construction of the same and the manner in which it operates, reference being had to the annexed drawings, making a part of this specification, in which—

Figure 1 is a front view of my improved yoke. Fig. 2 is a plan or top view of ditto.

Similar letters of reference indicate corresponding parts in each of the two figures.

The nature of my invention consists in placing the two bows of the yoke in slides and connecting the slides by means of chains or ropes passing over pulleys and arranged in a manner which will be hereafter shown, the slides fit in mortises or slots in the yoke, and by connecting the slides, as above mentioned neither of the bows can be moved laterally without communicating a corresponding opposite motion to the other. By this arrangement both bows are always equally distant from the center of the yoke and neither of the oxen can obtain any advantage over the other.

To enable others skilled in the art to make and use my invention I will proceed to describe its construction and operation.

A, represents the yoke having two mortises or slots (a) (a) (see Fig. 2, and dotted lines in Fig. 1) passing vertically through it.

B, B, are slides in which the bows C, C, are placed, the bows passing through tubes in the slides, and secured above by the ordinary keys (b) the slides fitting in the mortises or slots (a) (a), in the top surface of the yoke there are recesses (c) (c) in which plates D, D, on the upper part of the slides fit or work.

E, E, are chains which are attached to the slides as seen by the dotted lines in both drawings, these chains pass over the pulleys F, F, a pulley being placed at each end of the yoke and are attached to the ends of the rods G, G, seen more particularly in Fig. 2, these rods are attached to the plates D, D, a rod to each plate. The ends of the rods passing through upright projections (d) (d) on the plates, screw nuts (e) (e) being on the ends of the rods by which the chains are drawn sufficiently taut.

H, is the staple which passes vertically through the center of the yoke and secured by a key (f) which passes through slots in the ends of the staple the rods G, G, keeping the gey (f) in its proper place as they pass through the apertures in the ends of the key.

I is the ring placed in the staple.

By the above arrangement it will be seen that if either of the bows C, C, is moved laterally a corresponding opposite motion will be given the other, owing to the connection of the slides by means of the chains E, E, and rods G, G, and both bows will always be equally distant from the center of the yoke or point of draft. Thus neither of the oxen can at any time obtain an advantage over the other; they may be near each other or some distance apart still each ox will be equally distant from the center of the yoke.

I am aware that slides have been previously used in yokes, but they have not come into general use, the slides were not connected and consequently they did not possess sufficient utility, for when one ox moved his slide either off or toward the center of the yoke, he either obtained the advantage of his mate or lost what advantage he possessed, those yokes were only used in case of the cattle being unmanageable.

By the use of my improved slide yoke oxen will work much easier, and will not crowd or haul as is often the case in using the ordinary yoke, each ox endeavoring to obtain some advantage over his mate.

I do not claim the slides independently of their connection as they have been previously used, but,

Having thus described the nature of my invention, what I claim as new and desire to secure by Letters Patent, is—

The connecting of the slides B, B, in which the bows are secured by means of the chains E, E, and rods G, G, the chains passing over the pulleys F, F, by which neither of the slides nor bows can be moved laterally without communicating a corresponding opposite motion to the other, thus keeping the oxen at all times at equal distances from the center of the yoke, the chains, rods, and pulley being arranged as shown and described or in any other manner substantially the same.

EZRA HOUGH.

Witnesses:
 AZEB HOUGH,
 ALBERT HOUGH.